(12) United States Patent
Xie et al.

(10) Patent No.: US 7,816,040 B2
(45) Date of Patent: Oct. 19, 2010

(54) FUEL CELL

(75) Inventors: Gang Xie, Anjo (JP); Atsushi Kurita, Obu (JP); Yosuke Oyabe, Tsushima (JP); Shinji Nezu, Obu (JP); Naoki Ito, Aichi-gun (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 259 days.

(21) Appl. No.: 11/064,093

(22) Filed: Feb. 24, 2005

(65) Prior Publication Data

US 2005/0191529 A1    Sep. 1, 2005

(30) Foreign Application Priority Data

Mar. 1, 2004 (JP) ............................. 2004-056540
Jun. 22, 2004 (JP) ............................. 2004-183482

(51) Int. Cl.
*H01M 8/00* (2006.01)
(52) U.S. Cl. ................. 429/400; 429/479; 429/429; 429/492
(58) Field of Classification Search .............. 429/12, 429/400, 479, 429, 492
See application file for complete search history.

(56) References Cited

U.S. PATENT DOCUMENTS

| | | | |
|---|---|---|---|
| 5,672,439 A | 9/1997 | Wilkinson et al. | |
| 5,958,616 A | 9/1999 | Salinas et al. | |
| 6,756,141 B2* | 6/2004 | Miller et al. | 429/22 |
| 7,247,400 B2* | 7/2007 | Oyabe et al. | 429/13 |
| 2001/0033954 A1 | 10/2001 | Gyoten et al. | |
| 2003/0022032 A1 | 1/2003 | Miller et al. | |
| 2004/0247955 A1 | 12/2004 | Oyabe et al. | |
| 2005/0260470 A1* | 11/2005 | Nezu et al. | 429/21 |

FOREIGN PATENT DOCUMENTS

| | | |
|---|---|---|
| FR | 2 819 639 A1 | 7/2002 |
| JP | 4-305249 | 10/1992 |
| JP | 2000-502205 | 2/2000 |
| JP | 2001-297779 | 10/2001 |
| JP | 2003-086192 | 3/2003 |

OTHER PUBLICATIONS

U.S. Appl. No. 11/133,221, filed May 20, 2005, Xie, et al.
U.S. Appl. No. 10/629,550, filed Jul. 30, 2003, Shinji Nezu,et al.

* cited by examiner

*Primary Examiner*—Jane Rhee
(74) *Attorney, Agent, or Firm*—Oblon, Spivak, McClelland, Maier & Neustadt, L.L.P.

(57) ABSTRACT

A fuel cell includes a proton-conducting solid electrolyte, a fuel electrode provided on one side of the solid electrolyte, and an oxidant electrode provided on the other side of the solid electrolyte. The solid electrolyte includes at least one internal electrode therein. The fuel cell further includes a polarizing means for electrochemically polarizing the at least one internal electrode for oxidizing, or reducing, a fuel, or an oxidant, passing through an inside of the solid electrolyte.

35 Claims, 5 Drawing Sheets

US 7,816,040 B2

FUEL CELL

CROSS REFERENCE TO RELATED APPLICATIONS

This application is based on and claims priority under 35 U.S.C. §119 to Japanese Patent Application 2004-56540 and 2004-183482, filed on Mar. 1, 2004 and Jun. 22, 2004 respectively, the entire content of which is incorporated herein by reference.

FIELD OF THE INVENTION

This invention generally relates to a fuel cell. More particularly, this invention pertains to a fuel cell including a proton-conducting electrolyte.

BACKGROUND

A fuel cell such as a polymer electrolyte fuel cell is expected to expand in the future as a power source for a vehicle or a stationary generator. However, according to a known polymer electrolyte fuel cell, a defect such as a small hole formed in a polymer electrolyte membrane used as an electrolyte may be caused when the fuel cell is continuously operated. For example, it is widely known that hydrogen used as a fuel and oxygen used as an oxidant leak to respective counter electrode sides by passing through the polymer electrolyte membrane, and that with the passage of time the amount of leaking increases. When the amount of leaking exceeds a predetermined level, a danger arises of not only a decrease in cell output but also of combustion and explosions of gas that has passed through the polymer electrolyte membrane, thus preventing the fuel cell from operating. In these circumstances, a joint member of the polymer electrolyte membrane and the electrode needs to be replaced by a new one, or an entire fuel cell needs to be replaced.

In addition to the leaking of gas, a reduction in the quality of a polymer electrolyte membrane can occur as a result of an oxidative degradation or the like concomitant with the passage of operation time of the fuel cell. Proton conductivity is thereby decreased, resulting in a decrease in cell output. In order to extend a fuel cell life, it is necessary to clarify the reasons why a defect, or a change in quality may occur in the polymer electrolyte membrane.

It is highly desirable that hydrogen and oxygen supplied to the fuel cell do not permeate the polymer electrolyte membrane. However, in practice, considerable permeation may occur.

A greater part of oxygen permeating a counter electrode, i.e. the fuel electrode, from the oxidant electrode becomes water by reacting with hydrogen in the fuel electrode. At this time, however, since an electrode potential of the fuel electrode is low, hydrogen peroxide is generated, a process which causes damage to the polymer electrolyte membrane. Moreover, in the even of hydrogen permeating a counter electrode, i.e. the oxidant electrode, from the fuel electrode, a reaction speed of hydrogen with oxygen for generating water decreases since in a case where an electrode potential of the oxidant electrode is high, a catalytic property of a platinum catalyst used for the oxidant electrode relative to hydrogen oxidation decreases. Therefore, a state occurs in which hydrogen and oxygen exist in the oxidant electrode. In this state, if the oxidant electrode potential is lowered, hydrogen and oxygen rapidly react with each other, thereby causing damage to the polymer electrolyte membrane.

Thus, a need exists for a fuel cell in which a defect, or change in quality, in a solid electrolyte can be prevented.

Further, in order to prevent defects or changes in quality in a polymer electrolyte membrane, both hydrogen and oxygen should be prevented from passing through the polymer electrolyte membrane and thus reaching the respective counter electrodes. The present invention has been made in view of the above circumstances and provides such a fuel cell.

SUMMARY OF THE INVENTION

According to an aspect of the present invention, a fuel cell includes a proton-conducting solid electrolyte, a fuel electrode provided on one side of the solid electrolyte, and an oxidant electrode provided on the other side of the solid electrolyte. The solid electrolyte includes at least one internal electrode therein. The fuel cell further includes a polarizing means for electromechanically polarizing the at least one internal electrode for oxidizing, or reducing, a fuel, or an oxidant, passing through an inside of the solid electrolyte.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

An embodiment of the present invention is explained with reference to the attached drawings.

For purposes of clarifying an internal electrode and its electrochemical polarization method that are features of a polymer electrolyte fuel cell of the present invention, an operation of a fuel cell 1 according to the present embodiment is explained with reference to FIG. 1.

Figure 1:
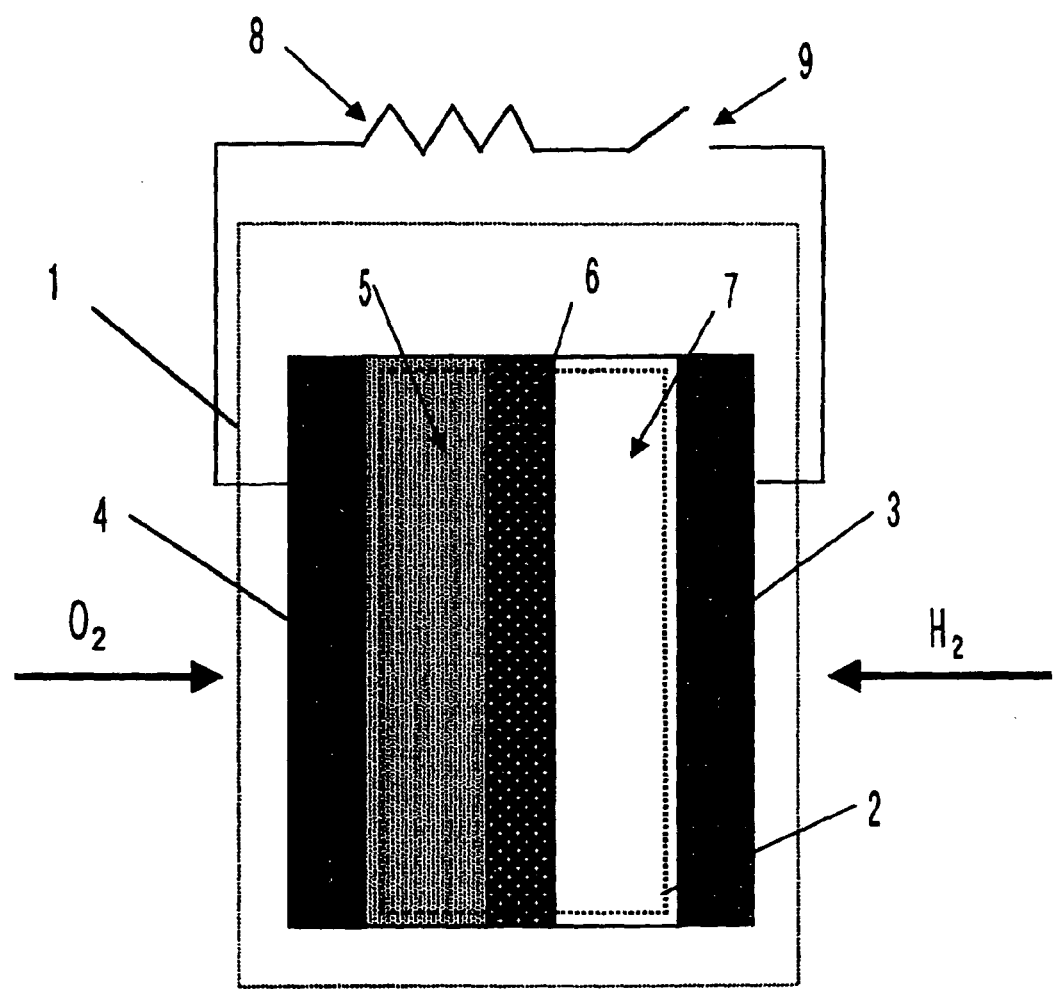
FIG. 1 is a cross-sectional view of a main portion of a fuel cell and its using state according to an embodiment of the present invention.

As shown in FIG. 1, a composite solid electrolyte 2 includes an electron conducting solid electrolyte 5, an internal electrode 6, and a true polymer electrolyte 7. The true polymer electrolyte 7 does not have electronic conductivity and has proton conductivity. The internal electrode 6 is formed by a mixture of a proton-conductive electrolyte and an electrode catalyst component, and thus the internal electrode 6 has proton conductivity, as well as electronic conductivity. A part of the hydrogen supplied to a fuel electrode 3 as fuel appropriate to a gas barrier level of the solid electrolyte to be used passes through the inside of the composite solid electrolyte 2 and reaches the side of a counter electrode, i.e. an oxidant electrode 4. The fuel supplied to the fuel electrode 3 may be methanol.

A part of the oxygen supplied to the oxidant electrode 4 also passes through the inside of the composite solid electrolyte 2 and reaches the side of the fuel electrode 3. When hydrogen and oxygen traveling in the composite solid electrolyte 2 on opposite sides to each other reach the internal electrode 6, they react with each other by means of a catalytic action of the internal electrode 6, and they are then consumed as they generate water.

If the amount of hydrogen passing through the solid electrolyte 2 is greater than that of oxygen, oxygen permeating the internal electrode 6 is in practice almost fully consumed, and excess hydrogen accordingly remains in the vicinity of the internal electrode 6. Then, at this time, it makes an assumption that the electron conducting solid electrolyte 5 has no electronic conductivity and accordingly has the same features as those of the true polymer electrolyte 7.

The hydrogen remaining in the vicinity of the internal electrode 6 further travels to the oxidant electrode 4 side and finally mixes with oxygen in the oxidant electrode 4. At this time, in an open circuit (i.e. when a switch 9 is in an open state), in which a load 8 is not connected to the fuel cell 1, a reaction speed of the hydrogen and oxygen in the oxidant electrode 4 is very slow, and as a result a considerable amount of hydrogen can be detected when gas in the oxidant electrode 4 is analyzed.

Even when for some reason, with the fuel cell 1 in a closed circuit state, a part of the oxidant electrode 4 is not contributing to power generation, the reaction speed of hydrogen and oxygen is slow in that part of the oxidant electrode 4. Since excess hydrogen exists in the vicinity of the internal electrode 6, a resting potential level thereof is controlled by hydrogen concentration, i.e. so as to be a relatively more positive value than that of the fuel electrode 3. With this electrode potential, hydrogen peroxide, as well as water, is generated by the reaction of hydrogen and oxygen in the internal electrode 6.

To give a simplified explanation, the resting potential of the internal electrode 6 is assumed to be 0.1V relative to that of the fuel electrode 3. This assumed value is close to a value according to an actual polymer electrolyte fuel cell. Further, the resting potential of the oxidant electrode 4 is assumed to be 0.95V relative to that of the fuel electrode 3. Accordingly, a cell with 0.85V is formed between the oxidant electrode 4 and the internal electrode 6 with the oxidant electrode 4 as a cathode.

Forming the electron conducting solid electrolyte 5 at this time by providing electronic conductivity to the true polymer electrolyte between the oxidant electrode 4 and the internal electrode 6 is tantamount to connecting the oxidant electrode 4 and the internal electrode 6 by an electronic conductor or an electronic conductive resistor. An electrochemically closed circuit is formed between the oxidant electrode 4 and the internal electrode 6 and thus an oxidant current flows in the internal electrode 6. In other words, the internal electrode 6 is electrochemically polarized.

Since the degree of polarization of the oxidant electrode 4 is less than that of the internal electrode 6, the electrode potential of the oxidant electrode 4 according to the actual polymer electrolyte fuel cell decreases to approximately 0.9V. The electrode potential of the internal electrode 6 increases to a value that can be obtained by subtracting from 0.9V a voltage equivalent to a sum of an electronic-conducting IR drop and an ion-conducting IR drop of the electron conducting solid electrolyte 5. Hydrogen in the internal electrode 6 is to all intents and purposes oxidized and consumed, and hydrogen can thus be prevented from traveling to the oxidant electrode 4.

In addition, since the electrode potential of the internal electrode 6 rises to a value that is slightly smaller than that of the oxidant electrode 4, the generation of hydrogen peroxide in the internal electrode 6 can be reduced to a level that may be virtually ignored.

In FIG. 1, it is extremely important that in the present embodiment the level of oxygen permeability of the electron conducting solid electrolyte 5 is low, i.e. that the degree of oxygen barrier is correspondingly high. Without oxygen barrier ability, it becomes difficult for a cell to be formed between the internal electrode 6 and the oxidant electrode 4, and thus the internal electrode 6 will become merely a part of the oxidant electrode 4. In these circumstances, the function of preventing hydrogen and oxygen from traveling to their respective counter electrode sides will be lost.

Figure 2:
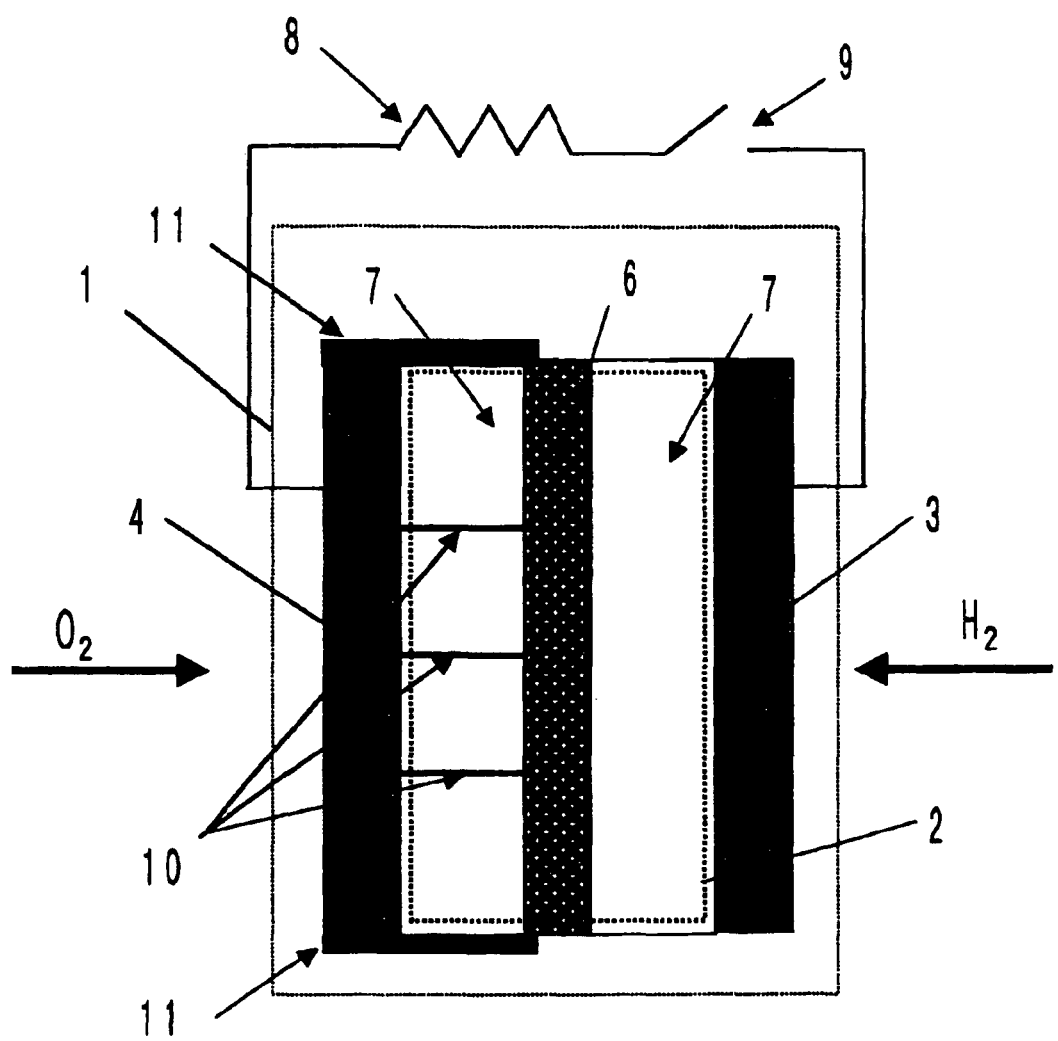
FIG. 2 is a cross-sectional view of the main portion of the fuel cell and its another using state according to the embodiment of the present invention.

According to the fuel cell 1 shown in FIG. 2, instead of the electronic-conductive connection between the oxidant electrode 4 and the internal electrode 6 by the electron conducting solid electrolyte 5 as shown in FIG. 1, the internal electrode 6 and the oxidant electrode 4 are electrically connected to each other by either an electronic conductor or an electronic-conductive resistor 10 penetrating through the inside of the true polymer electrolyte 7 so as to electrochemically polarize the internal electrode 6. Alternatively, the internal electrode 6 may also be electrochemically polarized by arranging an electronic conductor or an electronic-conductive resistance 11 around the true polymer electrolyte 7. In either case, the other operations of the fuel cell 1 are the same as those in FIG. 1.

Figure 3:
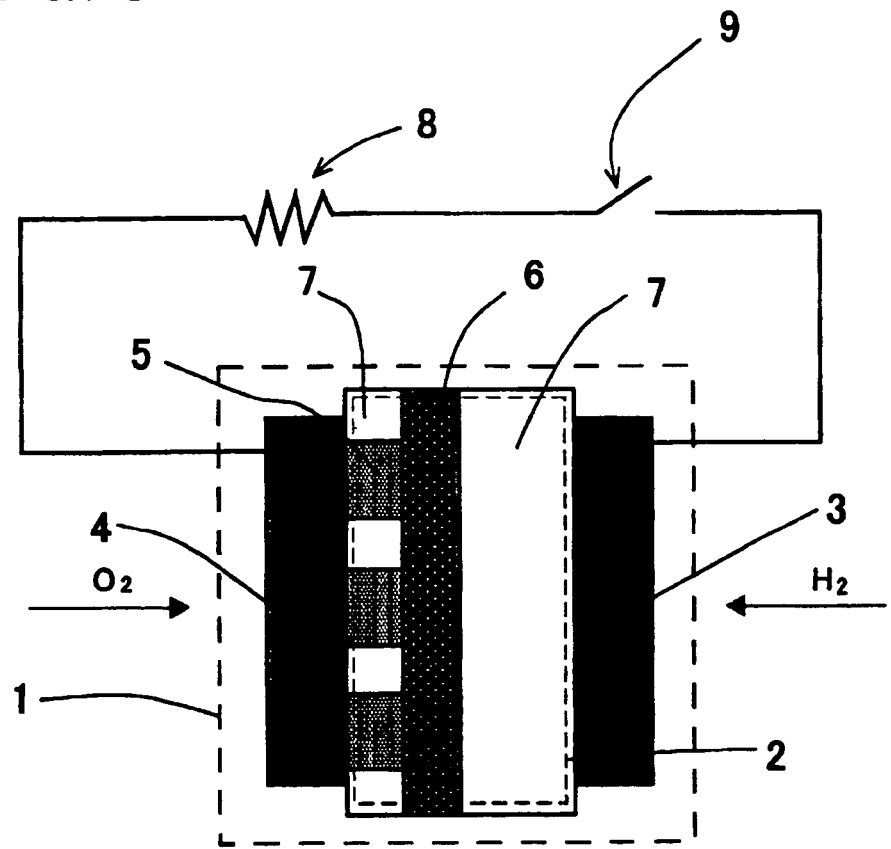
FIG. 3 is a cross-sectional view of the main portion of the fuel cell and its further another using state according to the embodiment of the present invention.
Figure 4:
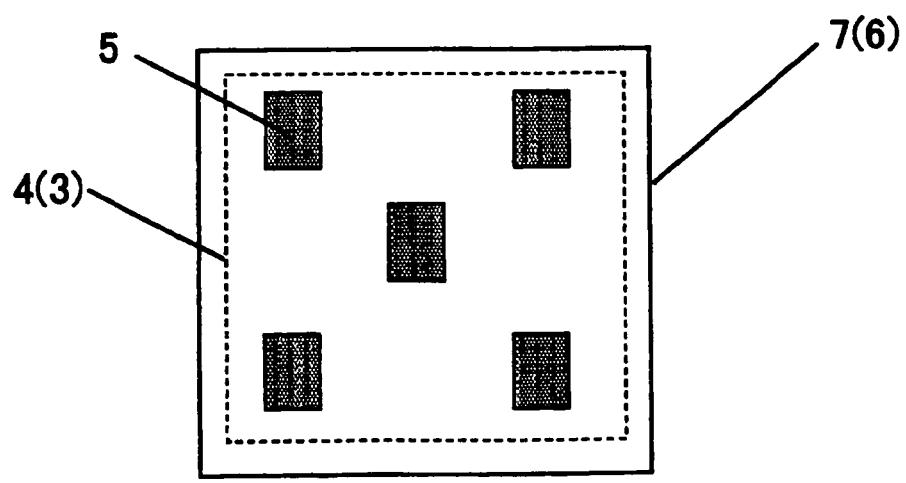
FIG. 4 is a side view of a solid electrode of an oxidant electrode side of FIG. 3.

According to the fuel cell 1 shown in FIG. 3, a part of the true polymer electrolyte 7 is replaced by the electron conducting solid electrolyte 5 so that the internal electrode 6 and the oxidant electrode 4 are connected to each other in an electronic conductive manner by the electron conducting solid electrolyte 5, thereby electrochemically polarizing the internal electrode 6. FIG. 4 is a side view of the solid electrolyte of the oxidant electrode side of FIG. 3.

Figure 5:
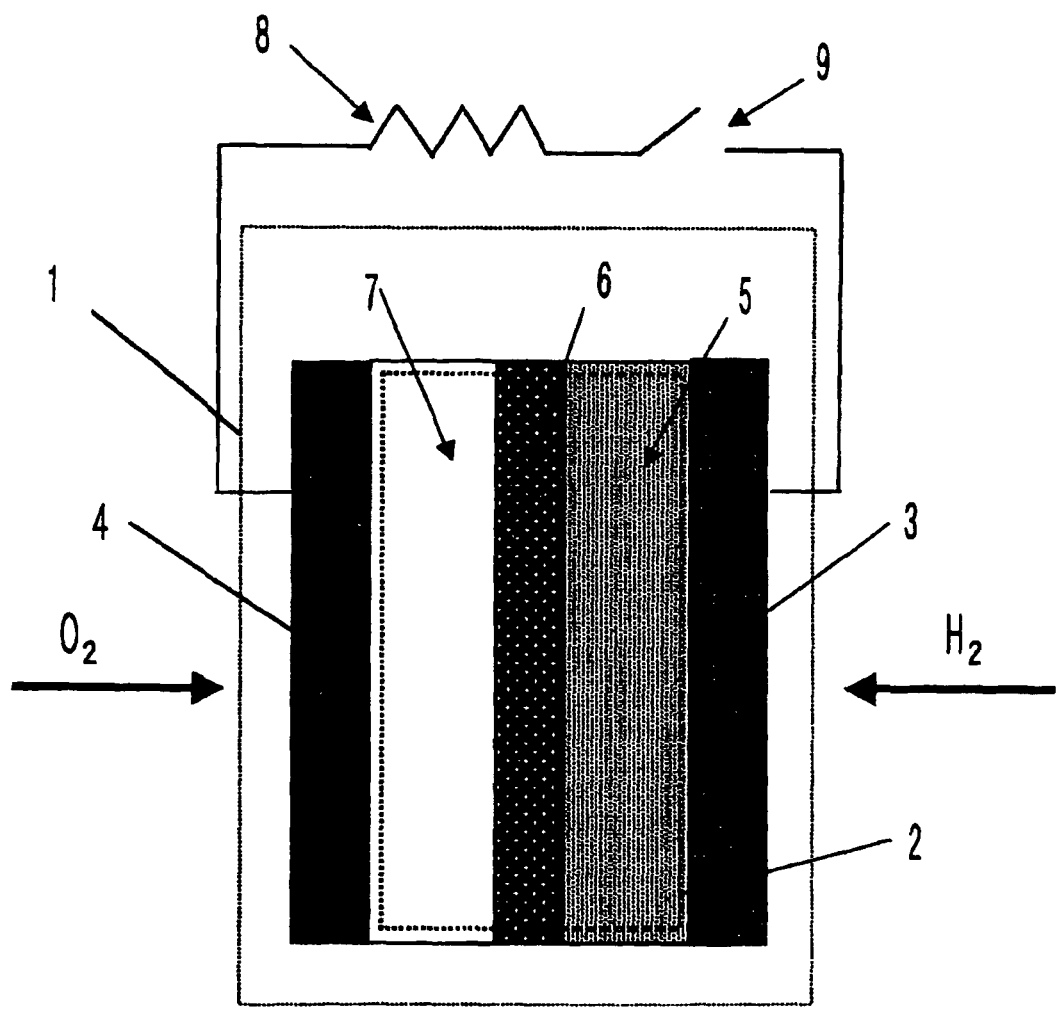
FIG. 5 is a cross-sectional view of the main portion of the fuel cell and its further another using state according to the embodiment of the present invention.

According to the fuel cell shown in FIG. 5, the electron conducting solid electrolyte 5, which is same as that of FIG. 1, is arranged between the internal electrode 6 and the fuel electrode 3 so that an electrochemically closed circuit is formed between the internal electrode 6 and the fuel electrode 3, thereby electrochemically polarizing the internal electrode 6. This structure is effective in a case where the amount of oxygen passing through the inside of the composite solid electrolyte 2 is greater than that of hydrogen.

Since oxygen exists excessively in the internal electrode 6, a resting potential thereof is controlled by the oxygen concentration, and thus a cell is formed between the internal electrode 6 and the fuel electrode 3. Then, the internal electrode 6 and the fuel electrode 3 are electrically connected by the electron conducting solid electrolyte 5 so that an electrochemically closed circuit is formed. A hydrogen oxidation occurs in the fuel electrode 3 while an oxygen reduction occurs in the internal electrode 6. All the oxygen is virtually consumed, any oxygen is thus prevented from traveling to the fuel electrode 3.

According to the aforementioned structure, commensurately with a decrease in the electrode potential of the internal electrode 6, hydrogen peroxide is more likely to be generated. Therefore, it is desirable that the electronic conductivity of the electron conducting solid electrolyte 5 is adjusted so that the electrode potential of the internal electrode 6 becomes approximately 0.5V or more relative to the electrode potential of the fuel electrode 3.

Figure 6:
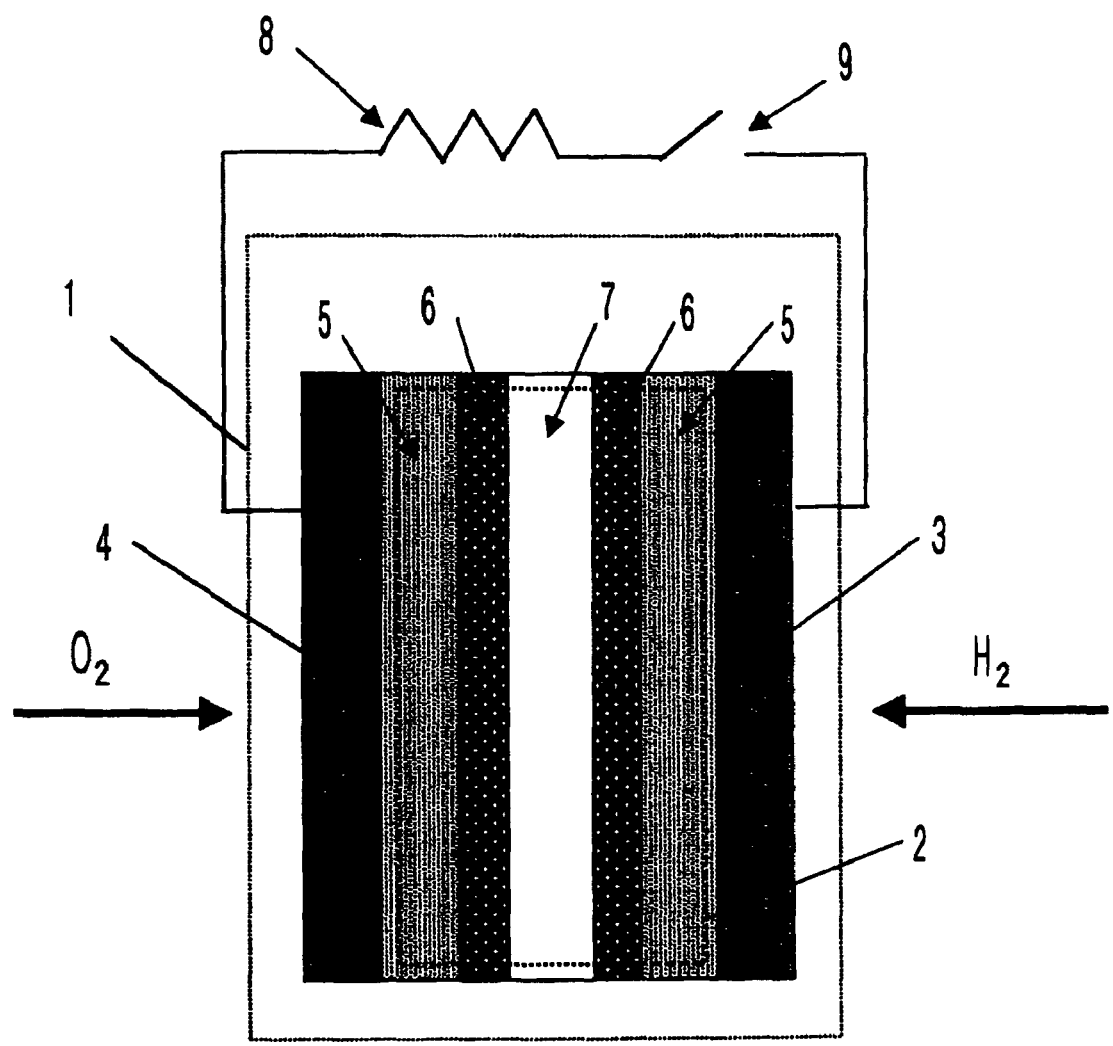
FIG. 6 is a cross-sectional view of the main portion of the fuel cell and its further another using state according to the embodiment of the present invention.

FIG. 6 shows an example of a structure in which respective amounts of oxygen and hydrogen passing through the inside of the composite solid electrolyte 2 are not equal to each other in an inward direction of the composite solid electrolyte 2. The operation principle of this structure may be interpreted as a composite case of the respective structures of FIGS. 1 and 5.

In other words, according to the fuel cell 1 shown in FIG. 6, the electron conducting solid electrolyte 5 and the internal electrode 6 are arranged between the true polymer electrolyte 7 and the fuel electrode 3. Expressed more precisely, the electron conducting solid electrolyte 5 is provided next to the fuel electrode 3, while the internal electrode 6 is provided next to the true polymer electrolyte 7. Accordingly, the closed circuit is formed between the internal electrode 6 and the fuel electrode 3 by providing the electron conducting solid electrolyte 5 between the internal electrode 6 and the fuel electrode 3.

Accordingly, the aforementioned structure is effective irrespective of whether the amount of oxygen than that of hydrogen, or vice versa, passing through the inside of the composite solid electrolyte 2 is greater. The mechanism for preventing excessive oxygen or excessive hydrogen from traveling to the counter electrode is as has already been described above.

A first embodiment of the present invention is explained with reference to FIG. 1 in detail. The fuel cell 1 according to the present embodiment was produced and analyzed as follows.

First, a commercially-available polymer electrolyte solution (SS1100 manufactured by Asahi Kasei) and a conductive carbon filler (VGCF manufactured by Showa Denko) were mixed to a predetermined volume ratio and sufficiently stirred with the use of an ultrasonic homogenizer so that a polymer electrolyte solution was prepared in which the carbon filler was uniformly dispersed. Next, with the use of an applicator with a clearance of 300 μm the polymer electrolyte solution was spread on a flat and smooth Teflon sheet so as to form a uniform thickness, and then air-dried. The polymer electrolyte solution was dried for 10 hours or more at approximately 60° C. so that a solvent in the polymer electrolyte solution was eliminated, thereby producing a dry cast film with the carbon filler (hereinafter called "electron conducting solid electrolyte 5"). The electron conducting solid electrolyte 5 produced in the aforementioned manner was sandwiched by a Teflon sheet and the like so that the surface of the electron conducting solid electrolyte 5 was not damaged, and then heated for approximately 1 minute at 150° C. for the purposes of separating the electron conducting solid electrolyte 5 from the Teflon sheet. Meanwhile, the aforementioned commercially-available polymer electrolyte solution, a platinum catalyst (HISPEC40000 manufactured by Johnson Matthey PLC, platinum supported amount: 40% by weight), and a small amount of water and isopropyl alcohol were mixed to a predetermined ratio and stirred so that a platinum catalyst paste was produced.

In addition, a commercially-available fluorinated polymer electrolyte membrane (membrane thickness: 30 μm) was cut out to approx. 7 cm square. One side face of the 7 cm-square fluorinated polymer electrolyte membrane was sprayed with a predetermined amount of the platinum catalyst paste per unit area and then air-dried. The 7 cm-square fluorinated polymer electrolyte membrane was then vacuum-dried for approx. 10 hours at 80° C. and a polymer electrolyte membrane with a platinum catalyst layer (hereinafter called "internal electrode 6") on one side thereof was prepared. The electron conducting solid electrolyte 5 was cut out, to a size identical to that of polymer electrolyte membrane, and superimposed on one side face of the polymer electrolyte membrane where the internal electrode 6 was formed. Further, the oxidant electrode 4 (electrode size: 10 cm$^2$) was superimposed on the electron conducting solid electrolyte 5 while the fuel electrode 3 (electrode size: 10 cm$^2$) was superimposed on the other side face of the polymer electrolyte membrane, on which the internal electrode 6 was not formed, such that a platinum catalyst applied face of the fuel electrode 3 was positioned facing the polymer electrolyte membrane. The above member was joined by hot-pressing for approximately 90 seconds with the load of 80 kg/cm$^2$ at 160° C., thereby obtaining the fuel cell 1 according to the present embodiment.

The aforementioned fuel electrode 3 and the oxidant electrode 4 were each produced by impregnating a carbon paper (manufactured by TORAY, thickness: 180 μm) in a Teflon dispersion solution (PTFE content: 20% by weight), burning the impregnated carbon paper at 360° C. or more so as to sinter Teflon (registered trademark) in a water-repellent processing, with the use of an applicator with 300 μm of clearance applying the platinum catalyst paste previously prepared on the carbon paper, and then vacuum-drying the carbon paper for 5 hours or more at 80° C. According to the fuel cell 1 produced in an aforementioned manner, the oxidant electrode 4 and the internal electrode 6 were electrically connected by the electrically conducting solid electrolyte 5, thereby configuring an electrochemically closed circuit.

The aforementioned fuel cell 1 was placed in a cell for fuel cell evaluation having a gas supply/exhaust function, a power collection function, and a gas sealing ability. The hydrogen and air, humidified with a gas bubbler filled with pure water, were respectively supplied at 2 atmospheres and at a rate of 200 ml per minute to the cell that is thermally maintained at 80° C. Then, a gas chromatograph analyzer (CP2002 manufactured by Varian) was connected to a gas exhaust port on the oxidant electrode 4 side of the fuel cell 1 for analyzing a concentration of hydrogen gas leaking from the fuel cell electrode 3 side to the oxidant electrode 4 side through the composite solid electrolyte layer 2 (the polymer electrolyte membrane, the internal electrode 6, and the electron conducting solid electrolyte 5).

For purposes of comparison, another fuel cell (hereinafter called "comparison fuel cell") was produced by a completely identical production method to that of the aforementioned fuel cell 1, exception insofar that the internal electrode 6 was not formed. Then, a concentration of hydrogen gas leaking to the oxidant electrode 4 side was analyzed under the same conditions as those for the fuel cell 1 of the present embodiment.

According to the results of the experiment, when the comparison fuel cell was used a concentration of hydrogen gas leaking to the oxidant electrode 4 side of the cell for evaluation was approximately 300 ppm. On the other hand, when the fuel cell 1 of the present embodiment was used hydrogen gas was not detected (i.e., a detection limit of the analyzer of 5 ppm or less).

A second embodiment is explained with reference to FIGS. 3 and 4. A fuel cell 1 according to the second embodiment was produced and analyzed as follows.

A carbon supported platinum catalyst (platinum supported amount: 70% by weight) was mixed and stirred with a commercially-available polymer electrolyte solution (SS1100 manufactured by Asahi Kasei) and as a dispersant, a predetermined amount of isopropyl alcohol, ethanol or the like so that a platinum catalyst paste was produced. The platinum catalyst paste produced was applied on the Teflon sheet with the use of an applicator with 300 μm of clearance, and then dried. The platinum catalyst paste was vacuum-dried for approximately 5 hours at 80° C., and a platinum catalyst layer decal film thereby prepared.

Meanwhile, two pieces of commercially-available fluorinated polymer electrolyte membrane (thickness: 15 μm and 30 μm respectively) were each cut out to approximately 190× 200 mm. The platinum catalyst layer decal film previously prepared was positioned on one face of the fluorinated polymer electrolyte membrane (thickness: 30 μm). The fluorinated polymer electrolyte membrane (thickness: 30 μm) with the platinum catalyst layer decal film provided was sandwiched by a Teflon sheet of a thickness of 50 μm. The fluorinated polymer electrolyte membrane (thickness: 30 μm) was then pressed by means of a hot-press machine (150° C., 80 kg/cm$^2$) that has a press face with high degree of flatness performance. Accordingly, a platinum catalyst layer (hereinafter called "internal electrode 6") was decal-transferred to one face of the fluorinated polymer electrolyte membrane (thickness: 30 μm).

Further, multiple bores were formed on the fluorinated polymer electrolyte membrane (thickness: 15 μm) within a dimension of 10% thereof. A mixture of a commercially-available carbon filler (VGCF manufactured by Showa Denko) and a polymer electrolyte solution, mixed to a predetermined volume ratio, was used as an electron conducting solid electrolyte for filling the multiple bores.

The fluorinated polymer electrolyte membrane (thickness: 15 μm) was superimposed on one side face of the fluorinated polymer electrolyte membrane (thickness: 30 μm) where the internal electrode 6 was formed. In addition, an oxidant electrode 4 was superimposed on the fluorinated polymer electrolyte membrane (thickness: 15 μm) while a fuel electrode 3 was superimposed on the other side face of the fluorinated polymer electrolyte membrane (thickness: 30 μm) such that a platinum catalyst applied face of the fuel electrode 3 was positioned facing the fluorinated polymer electrolyte membrane (thickness: 30 μm). The production methods of the oxidant electrode 4 and the fuel electrode 3 are described later.

The aforementioned member was joined by hot-pressing for approximately 90 seconds with the load of 80 kg/cm$^2$ at 160° C., thereby configuring a MEA (Membrane Electrode Assembly) of the fuel cell 1 according to the second embodiment.

The fuel electrode 3 (platinum supported amount: 0.4 mg/cm$^2$) and the oxidant electrode 4 (platinum supported amount: 0.4 mg/cm$^2$) were each produced by impregnating a carbon paper (thickness: 180 μm, dimension: 60 cm$^2$) in a water-repellent carbon dispersion solution, drying the impregnated carbon paper, burning the carbon paper at 360° C. or more as a water-repellent processing, with the use of an applicator with 300 μm of clearance applying the platinum catalyst paste previously prepared on the carbon paper, and vacuum-drying the carbon paper for 3 hours or more at 80° C.

The MEA of the fuel cell 1 was sandwiched and fixed with an experimental metal separator having a gas supply/exhaust function, a power collection function, and a gas sealing ability for configuring the fuel cell according to the second embodiment. Further, the fuel cell 1 was placed in a cell for fuel cell evaluation. The hydrogen and air, humidified with a gas bubbler filled with pure water, were respectively supplied at a rate of 200 ml per minute to the cell that is thermally maintained at 80° C. Then, a gas chromatograph analyzer was connected to a gas exhaust port on the oxidant electrode 4 side of the fuel cell 1 for analyzing a concentration of hydrogen gas leaking from the fuel cell electrode 3 side to the oxidant electrode 4 side through the composite solid electrolyte layer 2 (the polymer electrolyte membrane, the internal electrode 6, and the conducting solid electrolyte). An open circuit voltage was analyzed at the same time.

For purposes of comparison, under the same conditions as those for the MEA of the fuel cell 1 according to the second embodiment, another MEA using a commercially-available fluorinated polymer electrolyte membrane (thickness: 45 μm) (hereinafter called "comparison MEA") was prepared for analyzing a concentration of hydrogen gas leaking to the oxidant electrode 4 side, and the open circuit voltage.

According to the results of the experiment, in the comparison MEA a concentration of hydrogen gas leaking to the oxidant electrode 4 side of the cell was approximately 600 ppm while with the fuel cell 1 according to the second embodiment a concentration of hydrogen gas was approximately 200 ppm. In addition, the open circuit voltage of the comparison MEA was approximately 1.0V while the open circuit voltage of the fuel cell 1 of the second embodiment was approximately 0.95V.

In the aforementioned embodiments, the reason why a concentration level of leaking hydrogen gas of the fuel cell 1 or the MEA is less than that of the comparison fuel cell or the comparison MEA is as follows.

The electrochemically closed circuit was configured between the internal electrode 6 and the oxidant electrode 4 by providing therebetween the electron conducting solid electrolyte 5. The internal electrode 6 was electrochemically polarized in further positive direction from a resting potential, and thus excess hydrogen (excess gas generated through reaction of permeated hydrogen and permeated oxygen in the internal electrode 6) existing in the vicinity of the internal electrode 6 is oxidized, thereby preventing the permeated hydrogen from reaching the oxidant electrode 3.

According to the aforementioned embodiments, the electrode potential is generated in the internal electrode 6 by permeated hydrogen or oxygen inside of the solid electrolyte. By supplying the oxidation current or reduction current by polarizing the internal electrode 6 from the resting potential, and then oxidizing hydrogen or reducing oxygen existing in the vicinity of the internal electrode, the hydrogen or oxygen permeating inside of the solid electrolyte is preventing from reaching the counter electrode. The damage to the solid electrolyte may be prevented accordingly.

In addition, according to the aforementioned embodiments, the internal electrode 6 may consist of a catalytic metal. Further, the catalytic metal may contain a conductive material such as carbon and the solid electrolyte. The internal electrode 6 has a feature of changing the hydrogen and oxygen diffusing in the solid electrolyte to proton, water or the like. The internal electrode also has a function of proton permeability.

Further, according to the aforementioned embodiments, the internal electrode 6 is used in such a way that the solid electrolyte is separated, or partially separated by the internal electrode 6. That is, the solid electrolyte may be fully separated into the fuel electrode 3 side and the oxidant electrode 4 side by the internal electrode 6, or a part of cross-sectional area of the solid electrolyte may be covered with a small internal electrode.

Furthermore, according to the aforementioned embodiments, the internal electrode 6, and either the fuel electrode 3 or the oxidant electrode 4 form a cell inside of the fuel cell 1 via the solid electrolyte, and then provide electron conductivity to the solid electrolyte or connect the internal electrode 6, and either the fuel electrode 3 or the oxidant electrode 4 via the electronic conductor or the electronic-conductive resistor, thereby forming the electrochemically closed circuit. As a result, the internal electrode 6 is electromechanically polarized.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A fuel cell comprising:
a proton-conducting solid electrolyte;
a fuel electrode provided on one side of the proton-conducting solid electrolyte;
an oxidant electrode provided on the other side of the proton-conducting solid electrolyte;
the proton-conducting solid electrolyte including at least one internal electrode therein; and
a polarizing means which forms an electrochemically closed circuit between the at least one internal electrode, and either the fuel electrode or the oxidant electrode, for electrochemically polarizing the at least one internal electrode in order to prevent a fuel or an oxidant from reaching the oxidant electrode or the fuel electrode, respectively, by oxidizing the fuel or reducing the oxidant with the proton-conducting solid electrolyte,
wherein the polarizing means includes an electron conducting solid electrolyte portion including proton conductivity and arranged in laminate between the internal electrode and at least one of the fuel electrode and the oxidant electrode so as to electrically connect the internal electrode with the at least one of the fuel electrode and the oxidant electrode through the electron conducting solid electrolyte portion itself,
wherein the electron conducting solid electrolyte portion has a first surface that contacts the internal electrode and a second surface that contacts at least one of the fuel electrode and the oxidant electrode and wherein the electron conducting solid electrolyte portion is formed continuously from the first surface to the second surface, and
wherein the electron conducting solid electrolyte portion is different from the proton-conducting solid electrolyte and the proton-conducting solid electrolyte does not conduct electrons.

2. A fuel cell according to claim 1, wherein the closed circuit forming means includes a means for providing a complex including a complexed solid electrolyte portion and an complexed electron conducting solid electrolyte portion arranged between the internal electrode, and either the fuel electrode or the oxidant electrode.

3. A fuel cell according to claim 2, wherein the electron conducting electrolyte portion includes a mixture that is formed into a layer, and that includes a mixed proton conducting electrolyte, and either a graphite particle or a carbon fiber.

4. A fuel cell according to claim 1, wherein the internal electrode includes an electrode obtained by forming into a layer a mixture including an electrode catalyst and a proton conducting polymer electrolyte.

5. A fuel cell according to claim 1, wherein the proton-conducting solid electrolyte is a polymer electrolyte membrane.

6. A fuel cell according to claim 1, wherein the internal electrode is arranged such that the proton-conducting solid electrolyte is separated, or partially separated, by the internal electrode.

7. A fuel cell according to claim 1, wherein a hydrogen or a methanol is used as the fuel.

8. A fuel cell according to claim 5, wherein the polarizing means includes a closed circuit forming means for forming an electrochemically closed circuit between the at least one internal electrode, and either the fuel electrode or the oxidant electrode.

9. A fuel cell according to claim 8, wherein the closed circuit forming means includes a means for providing a complex including a complexed solid electrolyte portion and an complexed electron conducting solid electrolyte portion arranged between the internal electrode, and either the fuel electrode or the oxidant electrode.

10. A fuel cell according to claim 9, wherein the electron conducting solid electrolyte portion includes a mixture that is formed into a lamination, and that includes a mixed proton conducting electrolyte, and either a graphite particle or a carbon fiber.

11. A fuel cell according to claim 5, wherein the polarizing means includes a means for connecting the internal electrode, and either the fuel electrode or the oxidant electrode, by either an electronic conductor or an electronic-conductive resistor.

12. A fuel cell according to claim 5, wherein the internal electrode includes an electrode obtained by forming into a layer a mixture including an electrode catalyst and a proton conducting polymer electrolyte.

13. A fuel cell according to claim 5, wherein the internal electrode is arranged such that the proton-conducting solid electrolyte is separated, or partially separated, by the internal electrode.

14. A fuel cell according to claim 5, wherein a hydrogen or a methanol is used as the fuel.

15. A fuel cell according to claim 1, wherein the internal electrode includes an electrode obtained by forming into a layer a mixture including an electrode catalyst and a proton conducting polymer electrolyte.

16. A fuel cell according to claim 15, wherein the closed circuit forming means includes a means for providing a complex including a complexed solid electrolyte portion and an complexed electron conducting solid electrolyte portion arranged between the internal electrode, and either the fuel electrode or the oxidant electrode.

17. A fuel cell according to claim 16, wherein the electron conducting solid electrolyte portion includes a mixture that is formed into a lamination, and that includes a mixed proton conducting electrolyte, and either a graphite particle or a carbon fiber.

18. A fuel cell according to claim 1, wherein the internal electrode is arranged such that the proton-conducting solid electrolyte is separated, or partially separated, by the internal electrode.

19. The fuel cell according to claim 1, wherein the electrochemically closed circuit is between the at least one internal electrode and the fuel electrode.

20. The fuel cell according to claim 1, wherein the electrochemically closed circuit is between the at least one internal electrode and the oxidant electrode.

21. A fuel cell, comprising:
a proton-conducting solid electrolyte;

a fuel electrode provided on one side of the proton-conducting solid electrolyte;

an oxidant electrode provided on the other side of the proton-conducting solid electrolyte;

wherein the proton-conducting solid electrolyte includes at least one internal electrode; and a polarizing connection between the internal electrode and at least one of the fuel electrode and the oxidant electrode, wherein the polarizing connection is an electrochemically closed circuit that polarizes the at least one internal electrode and prevents a fuel or an oxidant present in the fuel cell from contacting a counter electrode by oxidizing the fuel or reducing the oxidant with the proton-conducting solid electrolyte, wherein the polarizing means includes an electron conducting solid electrolyte portion including proton conductivity and arranged in laminate between the internal electrode and at least one of the fuel electrode and the oxidant electrode so as to electrically connect the internal electrode with the at least one of the fuel electrode and the oxidant electrode through the electron conducting solid electrolyte portion itself, wherein the electron conducting solid electrolyte portion has a first surface that contacts the internal electrode and a second surface that contacts at least one of the fuel electrode and the oxidant electrode and wherein the electron conducting solid electrolyte portion is formed continuously from the first surface to the second surface, and wherein the electron conducting solid electrolyte portion is different from the proton-conducting solid electrolyte and the proton-conducting solid electrolyte does not conduct electrons.

22. A fuel cell comprising:

a proton-conducting solid electrolyte;

a fuel electrode provided on one side of the proton-conducting solid electrolyte; and an oxidant electrode provided on the other side of the proton-conducting solid electrolyte;

wherein the proton-conducting solid electrolyte includes therein at least one internal electrode and an electron conducting solid electrolyte portion including proton conductivity and arranged in laminate between the internal electrode and at least one of the fuel electrode and the oxidant electrode so as to electrically connect the internal electrode with said at least one of the fuel electrode and the oxidant electrode through an electron conducting solid electrolyte portion, wherein the electron conducting solid electrolyte portion has a first surface that contacts the internal electrode and a second surface that contacts at least one of the fuel electrode and the oxidant electrode and wherein the electron conducting solid electrolyte portion is formed continuously from the first surface to the second surface, and wherein the electron conducting solid electrolyte portion is different from the proton-conducting solid electrolyte and the proton-conducting solid electrolyte does not conduct electrons.

23. The fuel cell of claim 1, wherein the electron conducting solid electrolyte portion is between and in direct physical contact with both the internal electrode and the fuel electrode.

24. The fuel cell of claim 1, wherein the electron conducting solid electrolyte portion is between and in direct contact with both the internal electrode and the oxidant electrode.

25. The fuel cell of claim 21, wherein the electron conducting solid electrolyte portion is between and in direct physical contact with both the internal electrode and the fuel electrode.

26. The fuel cell of claim 21, wherein the electron conducting solid electrolyte portion is between and in direct contact with both the internal electrode and the oxidant electrode.

27. The fuel cell of claim 22, wherein the electron conducting solid electrolyte portion is between and in direct physical contact with both the internal electrode and the fuel electrode.

28. The fuel cell of claim 22, wherein the electron conducting solid electrolyte portion is between and in direct contact with both the internal electrode and the oxidant electrode.

29. The fuel cell of claim 22, wherein the electron conducting solid electrolyte portion electrochemically polarizes the internal electrode.

30. The fuel cell of claim 1, wherein the electron conducting solid electrolyte portion is continuous from the first surface to the second surface in a thickness direction of the fuel cell.

31. The fuel cell of claim 21, wherein the electron conducting solid electrolyte portion is continuous from the first surface to the second surface in a thickness direction of the fuel cell.

32. The fuel cell of claim 22, wherein the electron conducting solid electrolyte portion is continuous from the first surface to the second surface in a thickness direction of the fuel cell.

33. The fuel cell of claim 1, wherein the oxidant electrode is in direct contact with the electron conducting solid electrolyte portion, which is in direct contact with the internal electrode, which is in direct contact with the proton-conducting solid electrolyte, which is in direct contact with the fuel electrode.

34. The fuel cell of claim 21, wherein the oxidant electrode is in direct contact with the electron conducting solid electrolyte portion, which is in direct contact with the internal electrode, which is in direct contact with the proton-conducting solid electrolyte, which is in direct contact with the fuel electrode.

35. The fuel cell of claim 22, wherein the oxidant electrode is in direct contact with the electron conducting solid electrolyte portion, which is in direct contact with the internal electrode, which is in direct contact with the proton-conducting solid electrolyte, which is in direct contact with the fuel electrode.

* * * * *